United States Patent
Olderdissen (10) Patent No.: US 11,586,586 B2
(45) Date of Patent: Feb. 21, 2023

(54) INDEXES AND QUERIES FOR FILES BY INDEXING FILE DIRECTORIES

(71) Applicant: EMC IP Holding Company LLC, Hopkinton, MA (US)

(72) Inventor: Jan Ralf Alexander Olderdissen, Herrenberg (DE)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 179 days.

(21) Appl. No.: 16/429,413

(22) Filed: Jun. 3, 2019

(65) Prior Publication Data
US 2020/0379948 A1 Dec. 3, 2020

(51) Int. Cl.
G06F 15/16 (2006.01)
G06F 16/14 (2019.01)
G06F 16/907 (2019.01)
G06F 16/13 (2019.01)

(52) U.S. Cl.
CPC ............ *G06F 16/148* (2019.01); *G06F 16/13* (2019.01); *G06F 16/907* (2019.01)

(58) Field of Classification Search
None
See application file for complete search history.

(56) References Cited

U.S. PATENT DOCUMENTS

| | | | |
|---|---|---|---|
| 5,319,780 A | 6/1994 | Catino et al. | |
| 7,844,646 B1* | 11/2010 | Deshmukh | G06F 16/10 707/825 |
| 7,945,756 B1 | 5/2011 | Britton et al. | |
| 9,753,960 B1 | 9/2017 | Troyanovsky | |
| 2006/0074925 A1* | 4/2006 | Bixby | G06F 16/10 |

(Continued)

OTHER PUBLICATIONS

Harris. The DAM Difference: Filename vs Metadata, http://digitalassetmanagementnews.org/features/, pp. 1-6. (Year: 2018).*
How to Search in File Explorer in Windows 10. https://www.tenforums.com/tutorials/94452-search-file-explorer-windows-10-a.html, 2017, pp. 1-9. (Year: 2017).*

(Continued)

*Primary Examiner* — Alex Gofman
*Assistant Examiner* — Shelly X Qian
(74) *Attorney, Agent, or Firm* — Amin, Turocy & Watson, LLP (57) ABSTRACT

The described technology is generally directed towards improving indexes and queries for files by indexing file directories. According to an embodiment, a system can comprise a memory and a processor that can execute the components stored in the memory. The components can comprise a data interface to couple to a database system comprising a database storing metadata describing a file system, wherein the database comprises records that correspond to ones of directories of the file system, and wherein the records comprise a field that corresponds to files logically stored in the directories of the file system. The system can further comprise an indexing component that creates an index for the records based on an index key and an analysis of the ones of the files and the directories to which the records correspond, wherein the index comprises links between instances of the index key and ones of the directories. Further, the system can comprise a query component that queries the database for a file of the file system by employing a search key and the index.

20 Claims, 10 Drawing Sheets

(56) References Cited

U.S. PATENT DOCUMENTS

| | | | |
|---|---|---|---|
| 2006/0106899 A1* | 5/2006 | McArdle | G06F 16/10 |
| 2008/0077584 A1 | 3/2008 | Bachmann et al. | |
| 2008/0256138 A1 | 10/2008 | Sim-Tang | |
| 2009/0077097 A1 | 3/2009 | Lacapra et al. | |
| 2011/0016153 A1 | 1/2011 | Atta et al. | |
| 2013/0290301 A1* | 10/2013 | Victor | G06F 16/13 |
| | | | 707/722 |
| 2018/0365272 A1 | 12/2018 | Sastry | |
| 2019/0311047 A1 | 10/2019 | Guerra Delgado et al. | |

OTHER PUBLICATIONS

Non Final office action received for U.S. Appl. No. 16/429,327 dated Dec. 18, 2020, 36 pages.
Gilburg. Soft-deletion is actually pretty hard. https://medium.com/galvanize/, 2018, pp. 1-10. (Year: 2018).
Bass. Stacks, Queues, Depth First Search, and Breadth Frist Search. https://medium.com/@jamesonbass/, 2018, pp. 1-6. (Year:2018).
Non Final office action received for U.S. Appl. No. 16/429,358 dated Feb. 4, 2021, 41 pages.
Final Office action received for U.S. Appl. No. 16/429,327 dated Apr. 27, 2021, 25 pages.
Final Office action received for U.S. Appl. No. 16/429,358 dated Jul. 8, 2021, 26 pages.
Office Action dated Oct. 1, 2021 for U.S. Appl. No. 16/429,327, 23 pages.
Office Action dated Jan. 25, 2022 for U.S. Appl. No. 16/429,327, 22 pages.

\* cited by examiner

```
400 ─┐              INDEX 420                              DIRECTORY 410A
                                                          ┌──────────────────────┐
  460A  ABC → \ABC_INC\MXF\ABC_MOVIE-V000.MXF             │  \ABC_INC\MXF\       │
              ⋮                                           │ ┌──────────────────┐ │
        ABC → \ABC_INC\MXF\ABC_MOVIE-V998.MXF             │ │ABC_MOVIE-V001.MXF│ │ 430A
        ABC → \XYZ_INC\MISC\ABC_MOVIE-V999.MXF            │ └──────────────────┘ │
                                                          │          ⋮           │
        MOV → \ABC_INC\MXF\ABC_MOVIE-V000.MXF             │ ┌──────────────────┐ │
              ⋮                                           │ │ABC_MOVIE-V998.MXF│ │ 430B
        MOV → \ABC_INC\MXF\ABC_MOVIE-V998.MXF             │ └──────────────────┘ │
        MOV → \XYZ_INC\MISC\ABC_MOVIE-V999.MXF            └──────────────────────┘

001 → \ABC_INC\MXF\ABC_MOVIE-V000.MXF              DIRECTORY 410B
   465        ⋮                                           ┌──────────────────────┐
        001 → \ABC_INC\MXF\ABC_MOVIE-V998.MXF             │  \XYZ_INC\MISC\      │
                                                          │ ┌──────────────────┐ │
        MXF → \ABC_INC\MXF\ABC_MOVIE-V000.MXF             │ │FDLSRDSCA.TXT     │ │ 430C
              ⋮                                           │ └──────────────────┘ │
        MXF → \ABC_INC\MXF\ABC_MOVIE-V998.MXF             │ ┌──────────────────┐ │
        MXF → \XYZ_INC\MISC\ABC_MOVIE-V999.MXF            │ │ABC_MOVIE-V999.MXF│ │ 430D
                                                          │ └──────────────────┘ │
        FDL → \XYZ_INC\MISC\FDLSRDSCA.TXT                 │ ┌──────────────────┐ │
  460B  SRD → \XYZ_INC\MISC\FDLSRDSCA.TXT                 │ │LWDVZIGS.VOD      │ │ 430E
        TXT → \XYZ_INC\MISC\FDLSRDSCA.TXT                 │ └──────────────────┘ │
        100 → \XYZ_INC\MISC\FDLSRDSCA.TXT                 │          ⋮           │
                                                          │ ┌──────────────────┐ │
                                                          │ │FQFYDSBND.PDF     │ │ 430S
                                                          │ └──────────────────┘ │
                                                          └──────────────────────┘
```

INDEXES AND QUERIES FOR FILES BY INDEXING FILE DIRECTORIES

TECHNICAL FIELD

The subject application generally relates to manipulating data, and, for example, indexing data, and related embodiments.

BACKGROUND

Indexing can be a useful way to increase the performance of different data manipulation functions, e.g., queries, sorts, and relational joins. Indexes are broadly configurable with respect to fields included, sort order, use of multiple indexes. Balanced against the benefits that can accrue from using indexes is the overhead, e.g., cost of design, creation and updating and the extra processing.

One way that database administrators can try to mitigate the negative aspects of indexes is to take advantage of different efficiency features offered by database systems. However, even when the mitigation approaches work as planned, the approaches frequently lead to an increase in the size and complexity of the indexes, and this increase can counteract other index benefits. In addition, for very large enterprise systems, where the size of the system may already be an issue, smaller index size can be the difference between successful and failed systems.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

According to an embodiment, a system can comprise a memory that stores computer executable components and a processor that can execute the computer executable components stored in the memory. The computer executable components can comprise a data interface to couple to a database system comprising a database storing metadata describing a file system, wherein the database comprises records that correspond to ones of directories of the file system, and wherein the records comprise a field that corresponds to files logically stored in the directories of the file system. The system can further comprise an indexing component that creates an index for the records based on an index key and an analysis of the ones of the files and the directories to which the records correspond, wherein the index comprises links between instances of the index key and ones of the directories. Further, the system can comprise a query component that can locate a file of the file system by executing a first query of the database by employing a search key and the index, and by executing a second query for the file, of a directory identified by the first query.

According to another embodiment, a computer-implemented method can comprise coupling, by a system comprising a processor, to a data structure system comprising a data structure storing metadata describing a collection of objects, wherein the data structure comprises groups that correspond to ones of groups of objects of the collection of objects, and wherein the groups comprise a property that corresponds to objects logically stored in the groups of objects of the collection of objects. The method can further comprise creating, by the system, an index for the groups based on an index key and an analysis of the ones of the objects and the groups to which the objects correspond, wherein the index comprises links between instances of the index key and ones of the groups. Further, the method can comprise querying, by the system, the data structure for an object of the collection of objects by employing a search key and the index.

BRIEF DESCRIPTION OF THE DRAWINGS

The technology described herein is illustrated by way of example and not limited in the accompanying figures in which like reference numerals indicate similar elements, and in which.

DETAILED DESCRIPTION

Various aspects described herein are generally directed towards improving indexes and queries for files by indexing file directories, in accordance with one or more embodiments. As will be understood, the implementation(s) described herein are non-limiting examples, and variations to the technology can be implemented.

Reference throughout this specification to "one embodiment," "one or more embodiments," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

The computer processing systems, computer-implemented methods, apparatus and/or computer program products described herein employ hardware and/or software to solve problems that are highly technical in nature (e.g., improving indexes and queries for potentially massive data stores), that are not abstract and cannot be performed as a set of mental acts by a human. For example, a human, or even a plurality of humans, cannot manipulate a multitude of abstract index keys with the same level of accuracy and/or efficiency as the various embodiments described herein. It should further be noted that, one or more embodiments can be implemented with features that can improve management of massive data systems.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
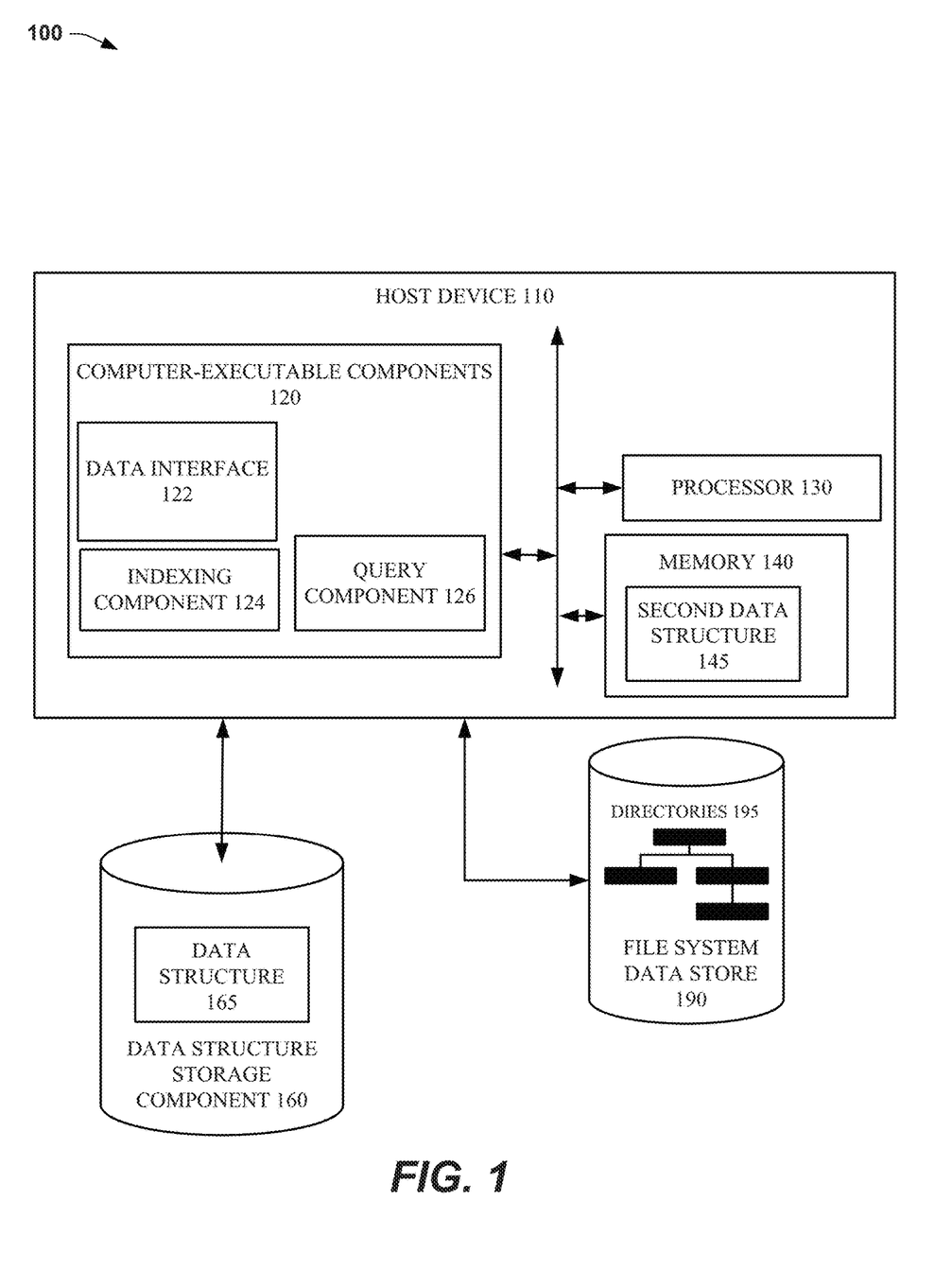
FIG. 1 illustrates a block diagram of an example, non-limiting system that can facilitate improving indexes and queries for files by indexing file directories, in accordance with various aspects and implementations of the subject disclosure.

FIG. 1 illustrates a block diagram of an example, non-limiting system 100 that can facilitate improving indexes and queries for files by indexing file directories, in accordance with various aspects and implementations of the subject disclosure. Generally speaking, functions and benefits that can be provided in some circumstances by one or more embodiments, include, but are not limited to, as discussed further with FIG. 5 below, reducing the size of index files, along with related benefits, reducing the time and overhead required to create and update indexes. It should be noted that while smaller enterprise databases (e.g., hundreds of thousands of records and gigabytes of data) would be expected to have indexes that are comparatively small and manageable, one or more embodiments consider enterprise databases at or near the top of data sizes (e.g., billions of records and terabytes or petabytes of data).

In addition, as discussed further with FIG. 4 below, one or more embodiments can improve query performance for indexed objects with a particular key pattern, e.g., large amounts of files with very similar file names. An example discussed below involves data storage for commercial video editing. In some circumstances there can be thousands of files with only small versioning or scene label changes (e.g., MOVIE-v001.MXF, MOVIE-v002.MXF, etc.).

Host device 110 can be coupled to data structure storage component 160, and a file system data store 190. In one or more embodiments host device 110 can collect metadata from file system data store 190, e.g., metadata describing the structure and contents of directories 195. Once collected, or more embodiments can process and store the metadata as structured data, e.g., in first data structure 165 of data structure storage component 160. In one or more embodiments, data structure storage component 160 can comprise a database system and first data structure 165 is a database created using the database system.

As discussed below, one or more embodiments can facilitate incremental aggregation of metadata for a file storage system by creating a second data structure 145 (also termed herein a "shadow data structure"). For this example, second data structure 145 is depicted as implemented using memory 140, but this example is non-limiting, and second data structure 145 can be implemented with other storage technologies.

As discussed further below with FIG. 10, in some embodiments, memory 140 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 140 are described below with reference to system memory 1016 and FIG. 10. Such examples of memory 140 can be employed to implement any embodiments of the subject disclosure.

In some embodiments, processor 130 can comprise one or more of a central processing unit, multi-core processor, microprocessor, dual microprocessors, microcontroller, System on a Chip (SOC), array processor, vector processor, and/or another type of processor. According to multiple embodiments, processor 130 can implement one or more computer and/or machine readable, writable, and/or executable components and/or instructions that can be stored on memory 140. For example, processor 130 can perform various operations that can be specified by such computer and/or machine readable, writable, and/or executable components and/or instructions including, but not limited to, logic, control, input/output (I/O), arithmetic, and/or the like. Further examples of processor 130 are described below with reference to processing unit 1014 and FIG. 10. Such examples can be employed with any embodiments of the subject disclosure. Also, as discussed with FIG. 5 below, one or more embodiments can be implemented using some of the multitasking capacity of a multi-core processor.

In one or more embodiments, in an example approach to performing the operations above, processor 130 can execute computer-executable components 120, including, but not limited to, as discussed below, data interface 122, indexing component 125, and query component 126.

In one or more embodiments, host device 110 can be used to implement systems that are designed for collecting, storing and utilizing metadata gathered from large file systems, e.g., CLARITYNOW provided by DELL EMC. Moreover, example system that include file system data store 190 functions, that can be used with one or more embodiments, include primary storage and archive platforms, e.g., ISILON® NETWORK ATTACHED STORAGE (NAS) and ECS® NATIVE OBJECT ARCHIVE provided by DELL EMC.

Figure 2:
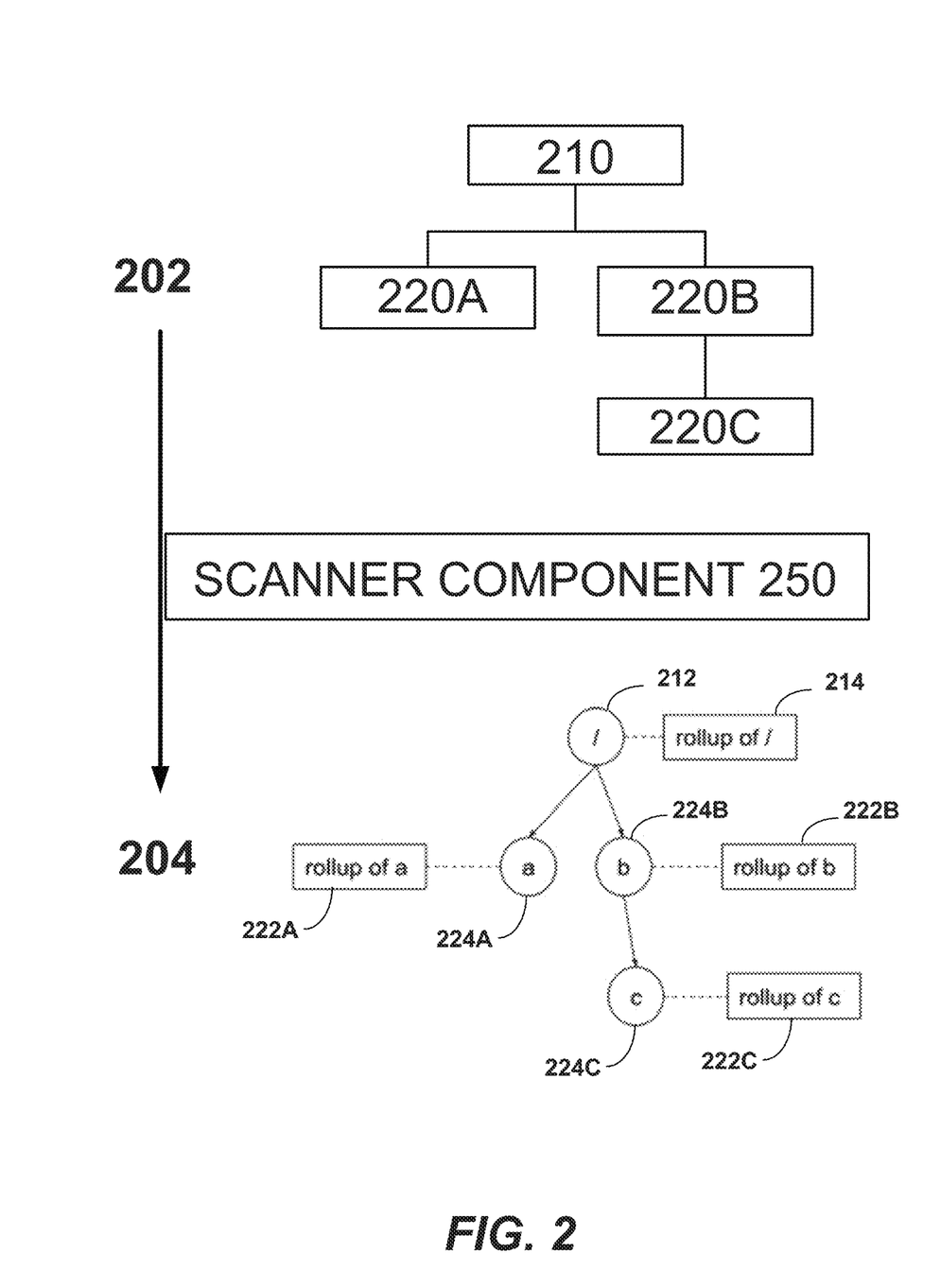
FIG. 2 illustrates a non-limiting example of a scanner component that can collect metadata describing a file system, in accordance with one or more embodiments described herein.

FIG. 2 illustrates a non-limiting example of a scanner component 250 that can collect metadata describing file system 202, in accordance with one or more embodiments described herein. Repetitive description of like elements and/or processes employed in respective embodiments is omitted for sake of brevity.

As used herein, file system 202 can contain files and have directories in a hierarchical structure, e.g., directories having one or more of an ancestor or descendant directory (also termed a subdirectory). One or more embodiments can employ a scanner component 250 to read the directory structure and contents of the directories of file system 202, and generate metadata structure 204, e.g., stored as first data structure 165 in data structure storage component 160.

As depicted, scanner component 250 can detect root directory 210 having subdirectories 220A and 220B, with subdirectory 220B having a subdirectory 220C. Based respectively on this example structure, root node 212 can have descendent nodes 225A and 224B, with descendent nodes 224B having descendent node 224C. In one or more embodiments, nodes 224A-C can have properties that describe the structure of the nodes and the contents of the nodes. An example database structure can have one record per node, with a key field corresponding to the path of the directory that corresponds to the node, e.g., a record for node 224C can have "/220B/220C" as a key field. In the discussion of curation with FIG. 4 below, different processes are described that are associated with the structure of this key field. Additional fields in the node records can include roll-up information, e.g., information that, because it is easily available, can improve the performance of different operations, e.g., searching and curating operations, described below.

As depicted, each subdirectory 212, 220A-C has a respective box 214, 222A-C for rollup data, this term being used herein to denote values aggregated across a folder and all its descendants. For example, rolled up "file size" covers the sum of the size of all files in a folder in addition to the sum of the size of all files of all descendant folders Examples of rolling up information include, as depicted in FIG. 2, information that can improve different functions by including aggregate values of the descendants of a node (e.g., a record for node 224B can include "/220C") and the file contents of the directory corresponding to the node, e.g., a record for node 224B can include file1.txt, because this file is stored in subdirectory 220B. Further examples of database schemas that can support different embodiments are discussed below with FIG. 4.

Figure 3:
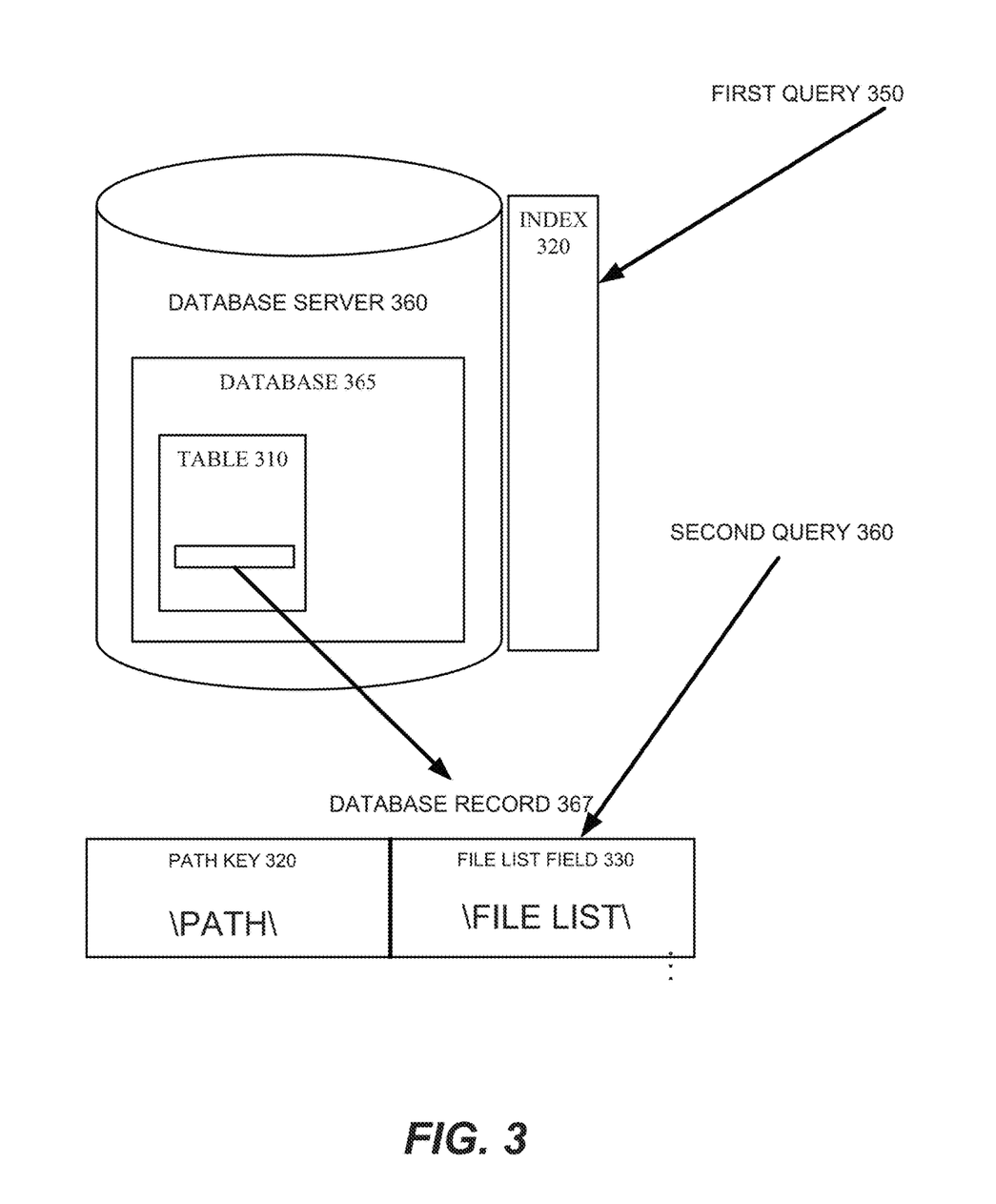
FIG. 3 illustrates a non-limiting example system that can facilitate improving indexes and queries for files by indexing file directories, in accordance with one or more embodiments described herein.

FIG. 3 illustrates a non-limiting example system 300 that can facilitate improving indexes and queries for files by indexing file directories, in accordance with one or more embodiments described herein. Repetitive description of like elements and/or processes employed in respective embodiments is omitted for sake of brevity.

An overview of the two-query process is shown, with database server 360 having table 310, which includes database records 367 that correspond to directories. As discussed with FIGS. 4-5 below, first query 350 can query index 320, for example, by using index character matching. Upon hitting a codon however, instead of returning a pathname for a specific file, a pathname for a record that corresponds to the directory that contains the matched file.

Once the search space is narrowed by the first query, in one or more embodiments, a different type of search (e.g., a pattern matching search) can be executed, using the same search terms as the first query, to search a file list, stored in a field of identified record 310. In additional embodiments, if additional records are produced from the first query, then the file lists of both records can be searched for the search terms.

Figure 5:
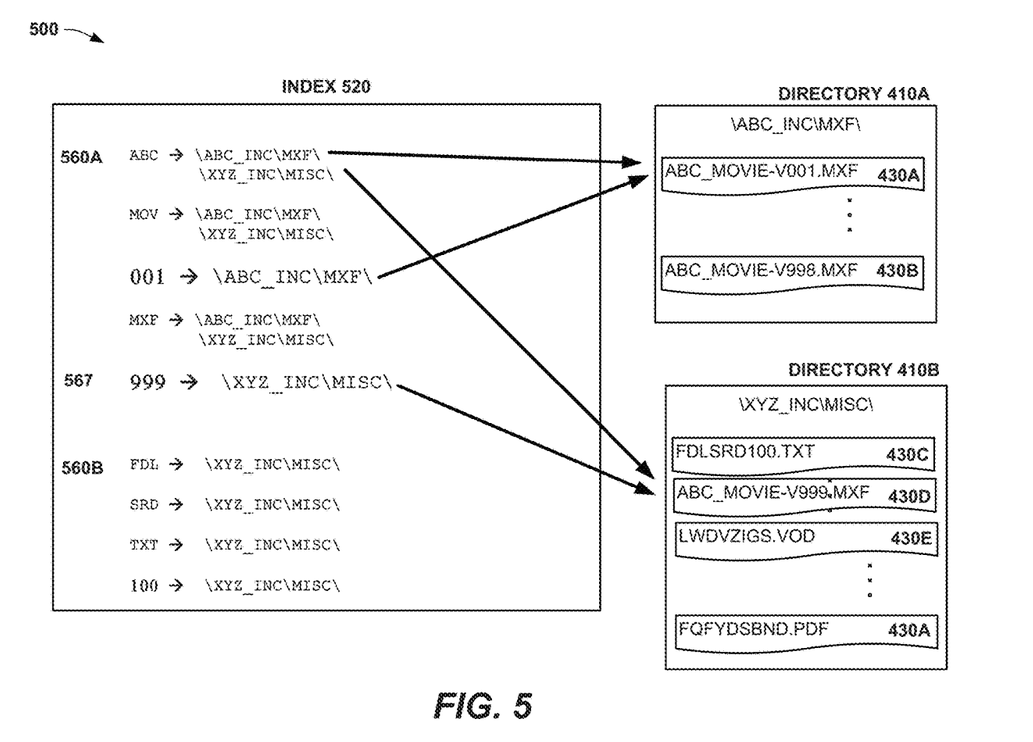
FIG. 5 illustrates a non-limiting example of one or more embodiments as applied to the directories 410A-B of FIG. 4, in accordance with one or more embodiments.
Figure 6:
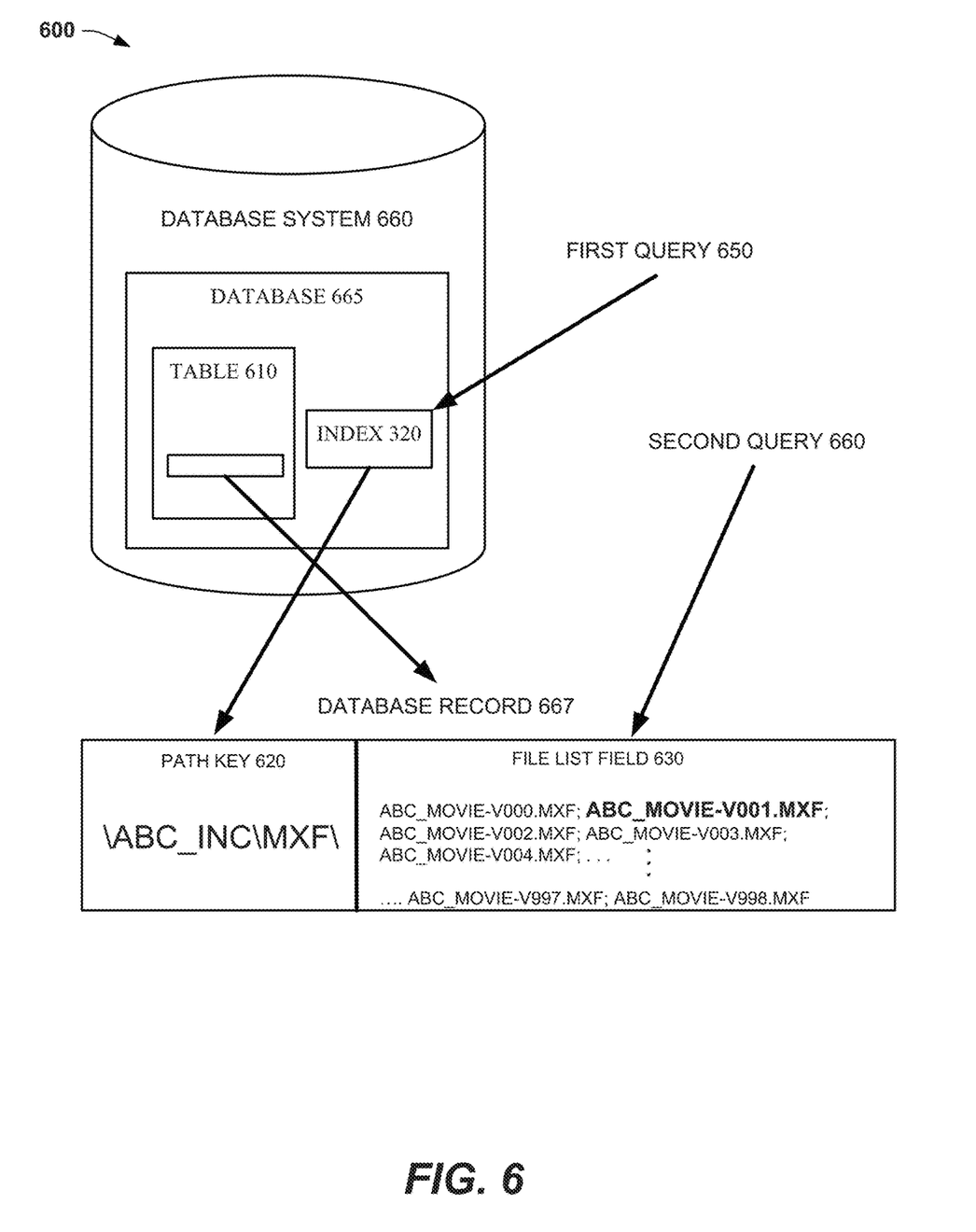
FIG. 6 illustrates non-limiting example approaches that can facilitate improving indexes and queries for files by indexing file directories, in accordance with one or more embodiments.

It should be noted that, because of the potentially smaller indexes generated by one or more embodiments, for the first query, the entire index may be able to be cached for rapid use. Similarly, after the narrowing to a smaller number of directories identified for search by the first query, for the second query 360, generally the entire file list can be cached with a single database read, e.g., reducing overhead, time spent, and database locking. FIGS. 4-6 describe different aspects of one or more embodiments that facilitate different potential benefits discussed herein.

Figure 4:
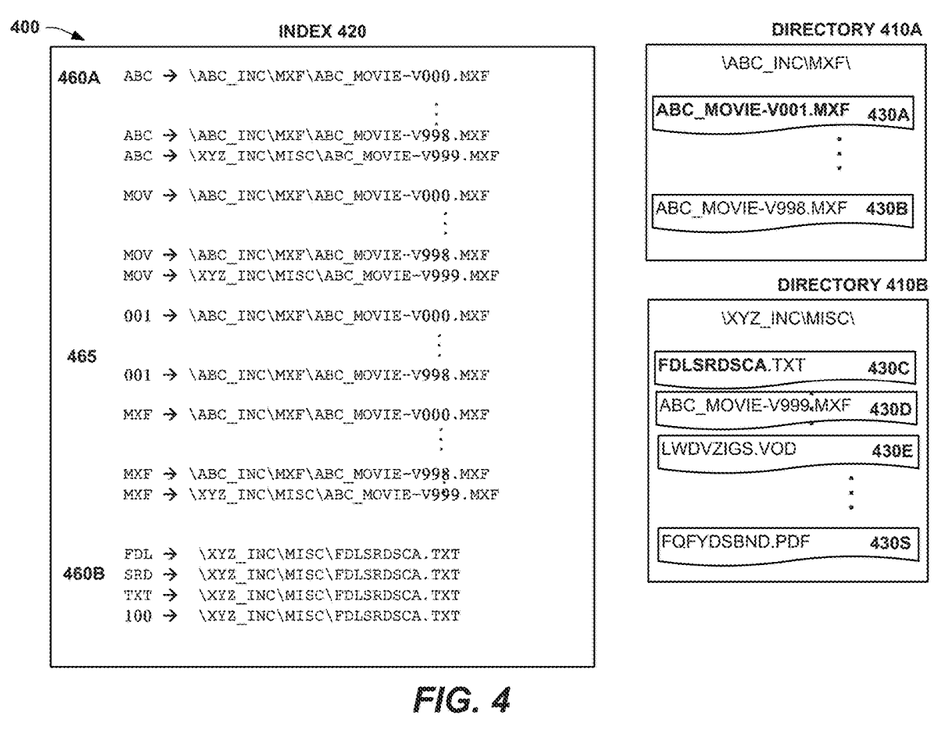
FIG. 4 illustrates a non-limiting example of an index created using an approach to indexing depicted as applied to two subdirectories in a file storage system, in accordance with one or more embodiments described herein.

FIG. 4 illustrates a non-limiting example of an index 420 created using an approach to indexing applied to two subdirectories 410A-B in a file storage system, in accordance with one or more embodiments described herein. Repetitive description of like elements and/or processes employed in respective embodiments is omitted for sake of brevity.

As depicted, directories 410A-B contain sets of files with filenames that emphasize some the features of one or more embodiments. Looking first at directory 410B, this directory is intended to be representative of a generally random distribution of filenames, e.g., files 430C-S. In contrast, the main characteristic of directory 410A is the relatively large number of files with very similar filenames, e.g., ABC_MOVIE-VXXX.MXF.

A note about an indexing approach used herein to illustrate the different approaches. In one or more embodiments, sets of three letters are selected from an indexed work (e.g., termed tuples or codons), and these selected letters are systematically applied to each of files 430A-S. It would be appreciated by one having skill in the relevant arts, given the description herein, that any other approach to applying index keys, and matching query keys to index keys can be used, without departing from the spirit of embodiments described herein.

Returning to the example, when a query key match is found with index 420, the complete path to the matched file is listed in the index with the index key. Thus, in an example 460B, the filename FULSRDSCA.TXT (e.g., file 430C) can have four tuples identified, e.g., FUL, SRD, SCA, TXT, and as depicted, when each of these are matched, the index adds a new line for each, per path. Similarly, the fifteen files from file 430E-S each get a new line in the index for different tuples for each (not shown).

Continuing this example, when applying the rules discussed for directory 410B, different features of embodiments are highlighted. When applying the same rules as for 460B, it can be determined that the 999 files in directory 410A translate to 999 index entries to be added per applied tuple, e.g., 4000 new entries into index 420. Returning to the example of 460A and the 999 similar filenames, it is clear that, for every tuple except for the three digit number tuple 465 (e.g., a thousand tuples represented by 001) the tuples are not useful in locating files.

FIG. 5 illustrates a non-limiting example of one or more embodiments as applied to the directories 410A-B of FIG. 4, in accordance with one or more embodiments. Repetitive description of like elements and/or processes employed in respective embodiments is omitted for sake of brevity. The approach of index 520 begins the same way as with index 420, e.g., selecting tuples with which to index the files, e.g., three tuples are matched to all the files of directory 410A, and 999 different tuples are each applied to a single file, e.g., tuples 000, 001 . . . 998.

It should be noted that for the matching tuples, instead of including the indexed filename in the index, as in index 420, with index 520, only a pathname of a directory that contains the match is added to the index.

In an example, when searching for ABC_MOVIE-V001.MXF, this filename would match four of four tuples shown in index 520. When another file from directory 410A is selected, ABC_MOVIE-V002.MXF, it matches three of the four tuples that matched the previous version, e.g., the 002 in the filename does nor match the 001 tuple, but it does match a 002 tuple (not shown), and because the example files have the same pathname, the same pathname will be included for the 002 tuple, if this additional file is added to index 520.

In an illustrative characteristic of the file placement in the example, the 998 similar MXF movies of directory 410A also have a single file with a similar filename placed in directory 410B. Because of this, both directories have the same directory pathname entry in index 520, even though there are 1000 times more matching files in directory 410A than 410B.

Comparing basic characteristics of the two index approaches, for the two filename types, there is generally no difference between the size of the index when both approaches are applied to the random filenames in directory 410B, e.g., the more tuples match across filenames (e.g., ¾ of the tuples apply to all the files in directory 410A) the more duplication can be removed by the approach of index 520.

When comparing the approaches, it is important to note that, when using index 420, when the pathname is produced, the file can quickly be retrieved, and the query is over. In contrast, when a tuple for a search term matches an index entry, this is a first of two queries that are performed to precisely locate the file. The second query is discussed with FIG. 6, below.

FIG. 6 illustrates non-limiting example approaches that can facilitate improving indexes and queries for files by indexing file directories, in accordance with one or more embodiments. For purposes of brevity, description of like elements and/or processes employed in other embodiments is omitted.

In addition to FIG. 3 and the description above FIG. 6 depicts an example database record 667 that can contain a list of files logically contained within the directory to which record 697 corresponds.

Figure 7:
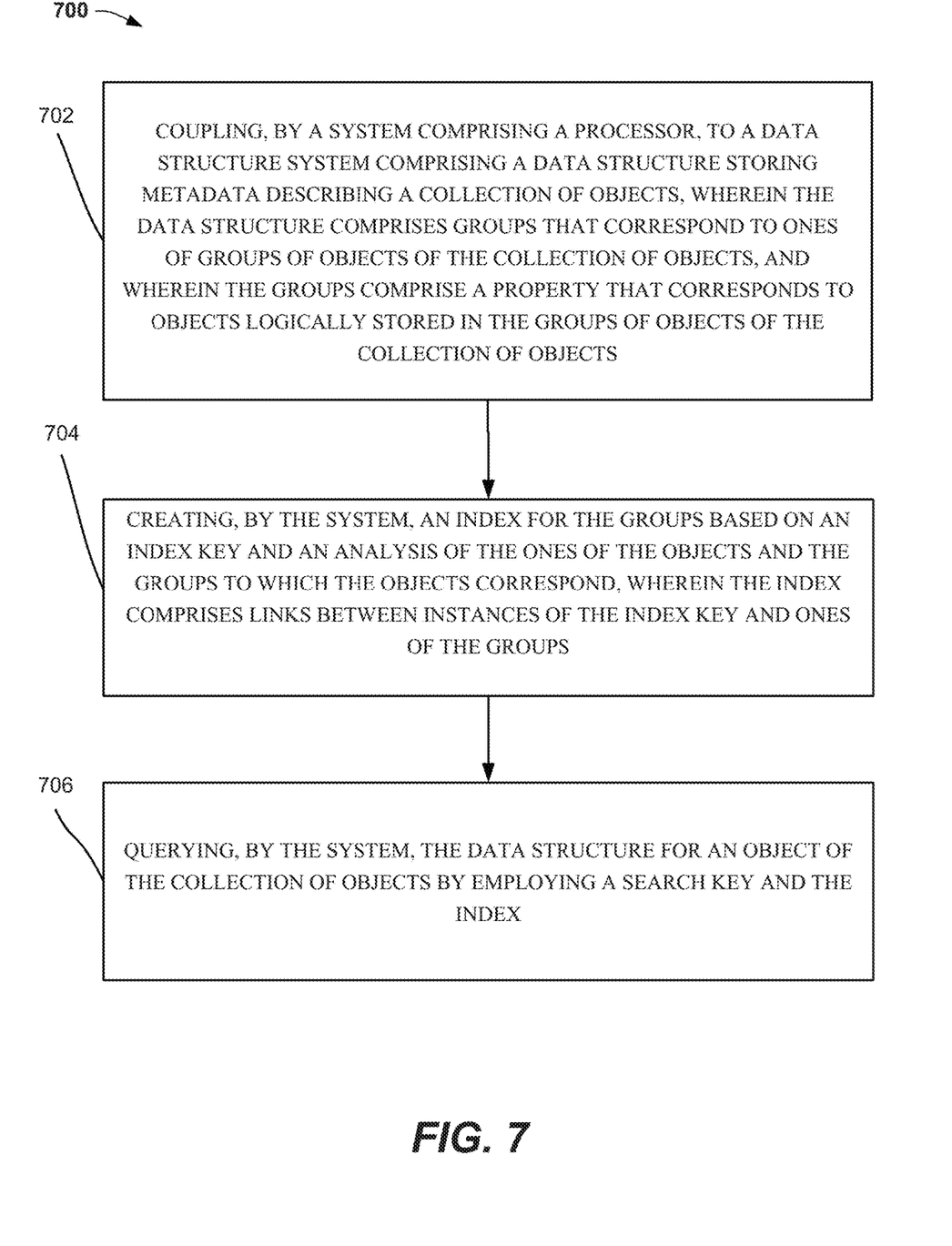
FIG. 7 illustrates an example flow diagram for a method that can facilitate improving indexes and queries for files by indexing file directories, in accordance with one or more embodiments.

FIG. 7 illustrates an example flow diagram for a method 700 that can facilitate improving indexes and queries for files by indexing file directories, in accordance with one or more embodiments. For purposes of brevity, description of like elements and/or processes employed in other embodiments is omitted.

At element 702, method 700 can comprise coupling, by a system comprising a processor, to a data structure system comprising a data structure storing metadata describing a collection of objects, wherein the data structure comprises groups that correspond to ones of groups of objects of the collection of objects, and wherein the groups comprise a property that corresponds to objects logically stored in the groups of objects of the collection of objects.

At element 704, method 700 can comprise creating, by the system, an index for the groups based on an index key and an analysis of the ones of the objects and the groups to which the objects correspond, wherein the index comprises links between instances of the index key and ones of the groups. At element 706, method 700 can comprise querying, by the system, the data structure for an object of the collection of objects by employing a search key and the index.

Figure 8:
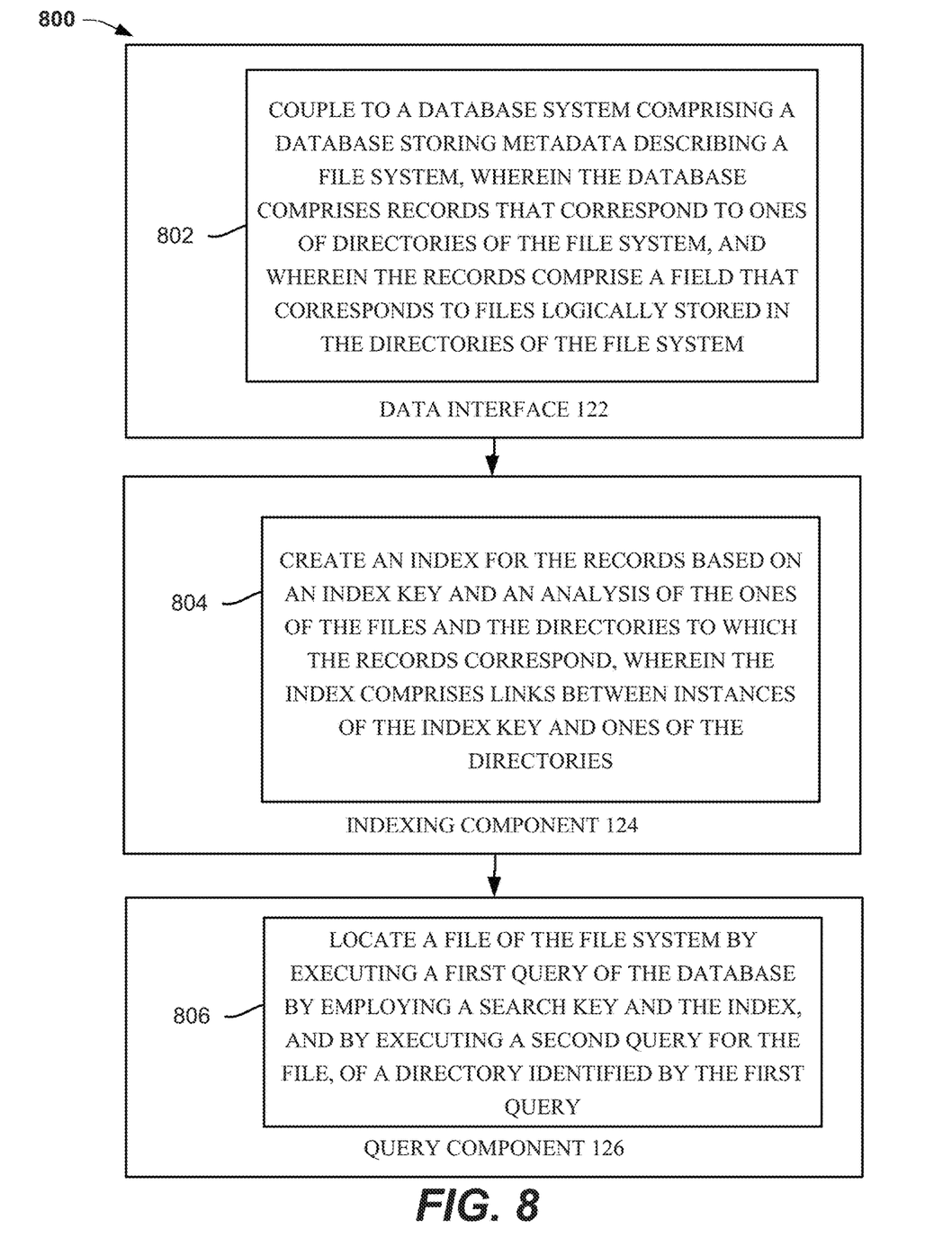
FIG. 8 is a flow diagram representing example operations of system comprising incremental aggregation of metadata for a file storage system, in accordance with one or more embodiments.

FIG. 8 is a flow diagram representing example operations of system comprising data interface 122, indexing component 125, and query component 126, in accordance with one or more embodiments. For purposes of brevity, description of like elements and/or processes employed in other embodiments is omitted.

Data interface 122 can be configured to couple to a database system comprising a database storing metadata describing a file system, wherein the database comprises records that correspond to ones of directories of the file system, and wherein the records comprise a field that corresponds to files logically stored in the directories of the file system.

Indexing component 125 can be configured to create an index for the records based on an index key and an analysis of the ones of the files and the directories to which the records correspond, wherein the index comprises links between instances of the index key and ones of the directories. Query component 126 can be configured to locate a file of the file system by executing a first query of the database by employing a search key and the index, and by executing a second query for the file, of a directory identified by the first query.

Figure 9:
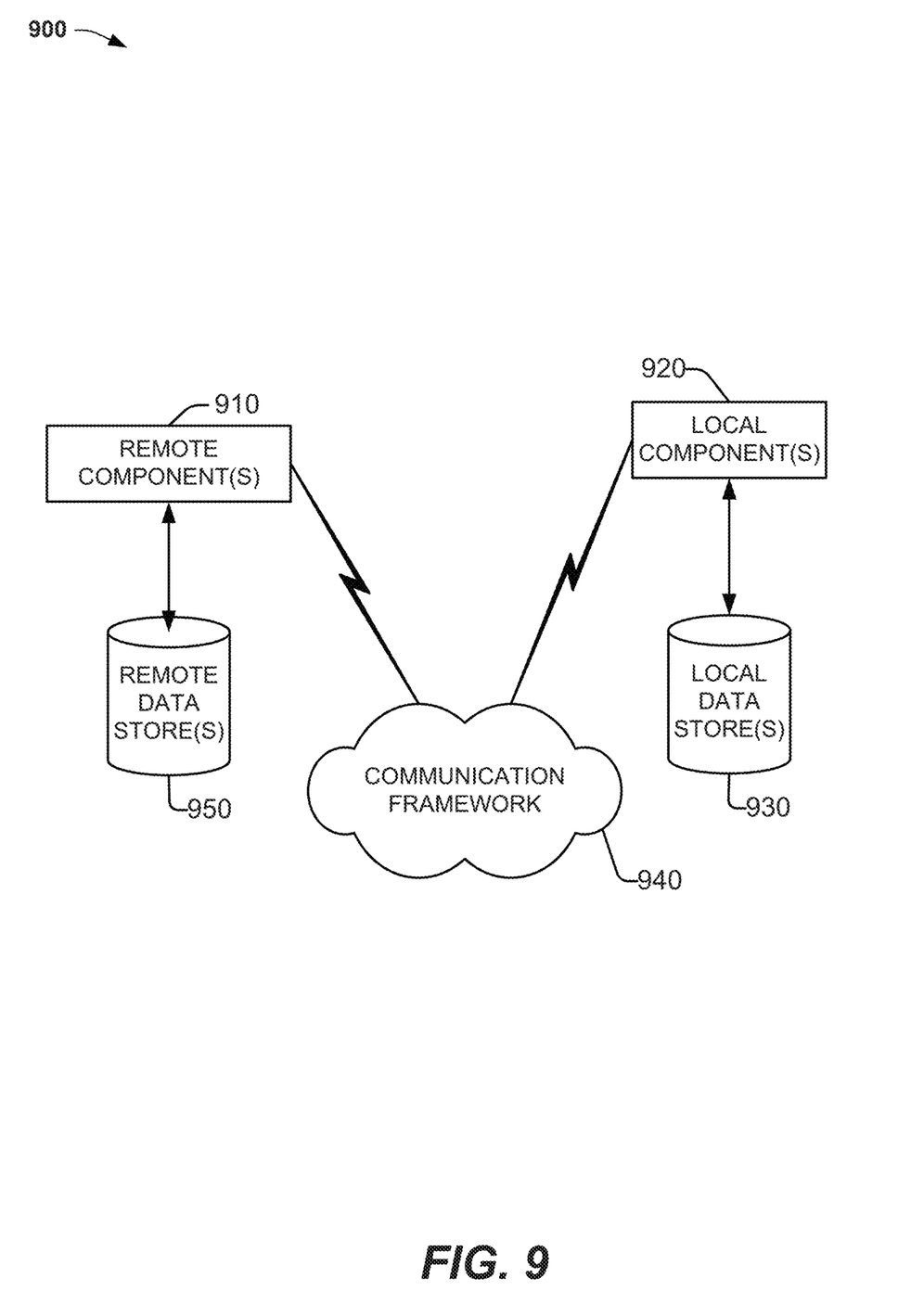
FIG. 9 depicts an example schematic block diagram of a computing environment with which the disclosed subject matter can interact, in accordance with one or more embodiments.

FIG. 9, in order to provide a context for the various aspects of the disclosed subject matter, is intended to provide a brief, general description of a suitable environment in which the various aspects of the disclosed subject matter can be implemented. The system 900 comprises one or more local component(s) 920. The local component(s) 920 can be hardware and/or software (e.g., threads, processes, computing devices).

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage, e.g., local data store(s) 930 and remote data store(s) 950, see below. Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 10:
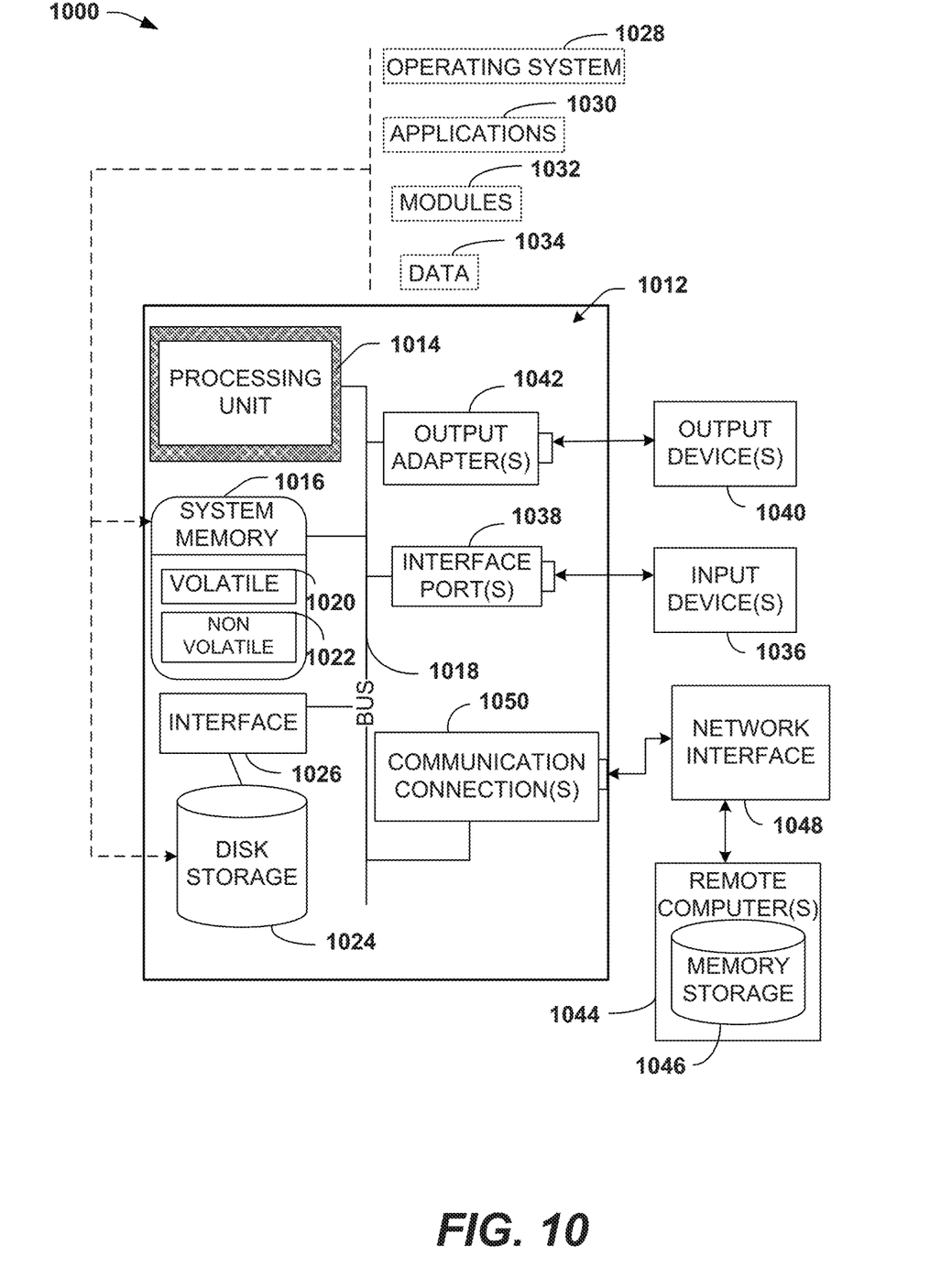
FIG. 10 illustrates an example block diagram of a computing system operable to execute the disclosed systems and methods in accordance with various aspects and implementations of the subject disclosure.

FIG. 10 illustrates a block diagram of a computing system 1000 operable to execute the disclosed systems and methods in accordance with one or more embodiments/implementations described herein. Computer 1012 can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1394), and small computer systems interface.

System memory 1016 can comprise volatile memory 1020 and non-volatile memory 1022. A basic input/output system, containing routines to transfer information between elements within computer 1012, such as during start-up, can be stored in non-volatile memory 1022. By way of illustration, and not limitation, non-volatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining a mapped cluster schema, altering the mapped cluster schema until a rule is satisfied, allocating storage space according to the mapped cluster schema, and enabling a data operation corresponding to the allocated storage space, as disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in a suitable operating environment, e.g., computing system 1000. Such software comprises an operating system 1028. Operating system 1028, which can be stored on disk storage 1024, acts to control and allocate resources of computer 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial bus port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to system bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A system, comprising:
    a memory that stores a cache and computer executable components; and
    a processor that executes the computer executable components stored in the memory, wherein the computer executable components comprise:
        a data interface to couple to a database system comprising a database storing metadata describing a file system, wherein the database comprises records that correspond to ones of directories of the file system, and wherein the records comprise a field that corresponds to files logically stored in the directories of the file system;
        an indexing component that creates an index for the records based on an index key and an analysis of the files and the ones of the directories to which the records correspond, wherein the index comprises links between instances of the index key and the ones of the directories;
        an incremental aggregating component that:
            collects information describing the files and the ones of the directories,
            aggregates the information into aggregated information, and
            periodically updates the database system to include the aggregated information as metadata associated with the files and the ones of the directories; and
        a query component that locates a file of the file system by executing a first query of the database by employing a search key and the index, and by executing a second query for the file, of a directory identified by the first query, wherein the search key comprises a searched incomplete portion of a pathname, wherein the pathname corresponds to nested subdirectories of a path to a directory of the directories of the file system that stores the file, wherein an incomplete portion comprises a combination of multiple subdirectories of the nested subdirectories, and wherein the index key comprises an indexed incomplete portion of the pathname.

2. The system of claim 1, wherein querying of the database by the query component comprises:
    identifying the directory by performing the first query of the database by employing the index to retrieve a link between the search key and the directory, wherein the directory logically contains the file; and
    performing the second query of the directory to identify the file.

3. The system of claim 2, wherein the first query and the second query individually comprise a single read operation.

4. The system of claim 3, wherein the second query identifies the file based on a query of the records.

5. The system of claim 4, wherein the query of the records comprises a pattern search of the field of the records based on the search key.

6. The system of claim 1, wherein the search key further comprises a portion of a filename of the file system.

7. The system of claim 1, wherein the index key does not comprise file metadata describing the files logically stored in the directories.

8. A method, comprising:
- coupling, by a system comprising a processor, to a data structure system comprising a data structure storing metadata describing a collection of objects, wherein the data structure comprises groups that correspond to ones of groups of objects of the collection of objects, and wherein the groups comprise a property that corresponds to objects logically stored in directories of a file system of objects;
- creating, by the system, an index for the groups based on an index key and an analysis of the objects and the ones of the groups to which the objects correspond, wherein the index comprises links between instances of the index key and the ones of the groups;
- aggregating, incrementally, by the system, information describing ones of the objects and the groups to which the objects correspond, resulting in aggregated object information;
- updating, by the system, the data structure system to include the aggregated object information as metadata associated with corresponding ones of the directories of the file system; and
- querying, by the system, the data structure for an object of the collection of objects by employing a search key and the index, wherein the search key comprises a searched incomplete portion of a pathname, wherein the pathname corresponds to nested subdirectories of a path to a directory of the directories of the file system that stores the object, wherein an incomplete portion comprises a combination of multiple subdirectories of the nested subdirectories, and wherein the index key comprises an indexed incomplete portion of the pathname.

9. The method of claim 8, wherein the querying the data structure comprises:
- performing a first query of the data structure by employing the index to retrieve a link between the search key and a group of objects of the collection of objects, wherein the group of objects logically contains the object; and
- performing a second query of the group of objects to identify the object.

10. The method of claim 9, wherein the first query and the second query individually comprise a single page read operation.

11. The method of claim 9, wherein the second query identifies the object based on querying the records.

12. The method of claim 11, wherein the querying of the records comprises a pattern search of a field of the records based on the search key.

13. The method of claim 8, wherein the search key further comprises a portion of a filename.

14. The method of claim 8, wherein the index key does not comprise file metadata describing a file.

15. A machine-readable storage medium comprising executable instructions that, when executed by a processor, facilitate performance of operations, the operations comprising:
- coupling to a system comprising a data store storing metadata describing a file system, wherein the data store comprises records that correspond to ones of directories of the file system, and wherein the records comprise a field that corresponds to files logically stored in the directories of the file system;
- creating an index for the records based on an index key and an analysis of the files and the ones of the directories to which the records correspond, wherein the index comprises links between instances of the index key and the ones of the directories;
- incrementally aggregating information describing the files and the ones of the directories, resulting in aggregated information;
- periodically updating the data store to include the aggregated information as metadata associated with corresponding files and the ones of the directories; and
- querying the data store for a file of the file system by employing a search key and the index, wherein the search key comprises a searched incomplete portion of a pathname, wherein the pathname corresponds to nested subdirectories of a path to a directory of the directories of the file system that stores the file, wherein an incomplete portion comprises a combination of multiple subdirectories of the nested subdirectories, and wherein the index key comprises an indexed incomplete portion of the pathname.

16. The machine-readable storage medium of claim 15, wherein the querying the data store comprises:
- performing a first query of the data store by employing the index to retrieve a link between the search key and a directory of the directories, wherein the directory logically contains the file; and
- performing a second query of the directory to identify the file.

17. The machine-readable storage medium of claim 16, wherein the first query and the second query individually comprise a single read operation.

18. The machine-readable storage medium of claim 16, wherein the second query identifies the file based on a query of the records.

19. The machine-readable storage medium of claim 18, wherein the query of the records comprises a pattern search of the field of the records based on the search key.

20. The machine-readable storage medium of claim 15, wherein the search key further comprises a portion of a filename.

* * * * *